(12) United States Patent
Matsuda et al.

(10) Patent No.: US 8,991,909 B2
(45) Date of Patent: Mar. 31, 2015

(54) VEHICLE

(71) Applicant: Fuji Jukogyo Kabushiki Kaisha, Tokyo (JP)

(72) Inventors: Hiroshi Matsuda, Tokyo (JP); Jun Watanabe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/031,439

(22) Filed: Sep. 19, 2013

(65) Prior Publication Data
US 2014/0084635 A1 Mar. 27, 2014

(30) Foreign Application Priority Data

Sep. 26, 2012 (JP) .................. 2012-212350
Jul. 1, 2013 (JP) .................. 2013-138269

(51) Int. Cl.
*B62D 25/00* (2006.01)
*B62D 27/02* (2006.01)
*B62D 29/00* (2006.01)
*B62D 25/02* (2006.01)
*B62D 25/04* (2006.01)

(52) U.S. Cl.
CPC ............. *B62D 25/00* (2013.01); *B62D 27/023* (2013.01); *B62D 29/001* (2013.01); *B62D 25/02* (2013.01); *B62D 25/04* (2013.01); *B62D 29/005* (2013.01)
USPC ................ 296/205; 296/193.06; 296/203.03; 296/187.12

(58) Field of Classification Search
USPC .................. 296/205, 203.03, 193.06, 187.09, 296/187.12; 29/530
IPC ........................................................ B62D 25/00
See application file for complete search history.

(56) References Cited

U.S. PATENT DOCUMENTS

| | | | |
|---|---|---|---|
| 3,842,944 A | 10/1974 | Shiotani et al. | |
| 5,819,408 A | 10/1998 | Catlin | |
| 6,233,826 B1 * | 5/2001 | Wycech | 29/897.1 |
| 6,451,876 B1 | 9/2002 | Koshy | |
| 6,474,726 B1 * | 11/2002 | Hanakawa et al. | 296/191 |
| 6,478,367 B2 * | 11/2002 | Ishikawa | 296/203.03 |
| 6,619,727 B1 | 9/2003 | Barz et al. | |
| 7,119,149 B2 | 10/2006 | Ferguson et al. | |
| 7,488,017 B2 * | 2/2009 | Lassl et al. | 293/133 |
| 7,581,782 B2 | 9/2009 | Tomozawa | |
| 7,753,437 B2 | 7/2010 | Klimek | |
| 8,047,603 B2 | 11/2011 | Goral et al. | |
| 2008/0066983 A1 | 3/2008 | Kimoto et al. | |
| 2012/0153669 A1 | 6/2012 | Nagwanshi et al. | |
| 2013/0257098 A1 | 10/2013 | Matsuda et al. | |
| 2014/0084633 A1 | 5/2014 | Matsuda et al. | |

FOREIGN PATENT DOCUMENTS

| | | |
|---|---|---|
| JP | 2000-108930 A | 4/2000 |
| JP | 2001-71948 A | 3/2001 |
| JP | 2004-123036 A | 4/2004 |

* cited by examiner

*Primary Examiner* — Pinel Romain
(74) *Attorney, Agent, or Firm* — Smith, Gambrell & Russell, LLP

(57) ABSTRACT

A vehicle includes: a main frame having a plurality of members; and a reinforcing member that is made of a reinforced resin and that is disposed at a junction where two members out of the plurality of members intersect a point from two directions or a bent portion of one member.

20 Claims, 16 Drawing Sheets

VEHICLE

CROSS REFERENCES TO RELATED APPLICATIONS

The present application claims priority from Japanese Patent Application No. 2012-212350 filed on Sep. 26, 2012 and Japanese Patent Application No. 2013-138269 filed on Jul. 1, 2013, the entire contents of which are hereby incorporated by reference.

BACKGROUND OF THE INVENTION

1. Field of the Invention

The present invention relates to a vehicle having a main frame having a plurality of members.

2. Description of the Related Art

Conventionally, in a vehicle including a main frame having a plurality of members, for example, in a vehicle having a monocoque structure, outer and inner panels that constitute the main frame of the vehicle are made of a steel sheet (a high tensile steel sheet or a super high tensile steel sheet), an iron sheet, an aluminum sheet, or the like. In order to ensure that a vehicle cabin space is safe against an instantaneous impact from a front direction or a side direction, or against an offset collision, such a monocoque structure is required to have sufficient strength and stiffness (transmission of force).

On the other hand, when the vehicle drives around a curve, driving stability that is influenced by transmission of a load is required. Accordingly, a balance is required between driving stability and collision safety that is influenced by strength against a collision such as that described above.

Furthermore, it is required to prevent noise from being generated and transmitted due to vibration and the like. Also, the vehicle having the monocoque structure includes front pillars, roof pillars, center pillars, door sills, and the like. In order to efficiently disperse a load or an impact applied to the respective members, sufficient joint stiffness is required on a junction of the respective members and a bent portion in which the direction of force transmission is changed.

For example, Japanese Unexamined Patent Application Publication (JP-A) No. 2000-108930 discloses a lower structure of a vehicle side that securely disperses and transmits a collision load from a front or side of a vehicle to other members and suppresses deformation due to the collision.

JP-A No. 2001-71948 discloses a structure that is provided on a side roof of a vehicle side with a rail reinforcing member and on a door sill with a sill strength adjusting member, respectively, and that changes the vehicle deformation mode upon the occurrence of a side collision.

On the other hand, JP-A No. 2004-123036 discloses a technique for molding at least either one of an inner panel and an outer panel out of fiber reinforced plastic in a structure for fixing a securing wire harness to a vehicle body.

However, in the above three Japanese Unexamined Patent Application Publications, the vehicle frame has insufficient strength and stiffness in view of driving stability and collision safety.

Also, in the above three Japanese Unexamined Patent Application Publications, the vehicle frame cannot prevent noise from being generated and transmitted due to vibration or the like. Furthermore, the vehicle frame does not have sufficient joint stiffness to adequately transmit a force applied to a junction among members and a bent portion of a member.

SUMMARY OF THE INVENTION

Accordingly, it is an exemplary object of the present invention to provide a vehicle that can achieve a balance between strength and stiffness of the vehicle frame in view of driving stability and collision safety.

An aspect of the invention provides a vehicle including: a main frame having a plurality of members; and a reinforcing member made of a reinforced resin and disposed at a junction where two members out of the plurality of members intersect a point from two directions or at a bent portion of one of the plurality of members.

Preferably, the two members at the junction where the two members intersect a point from two directions are joined through the reinforcing member.

Preferably, the reinforcing member has a three-directional structure.

Preferably, the two members includes an outer member and an inner member, and the reinforcing member is disposed in a tubular hollow space defined between the outer and inner members so as to make a clearance in which the reinforcing member nearly comes into contact with inner walls of the outer and inner members.

Preferably, the reinforcing member is disposed in a hollow space defined in a bent portion of one of the plurality of members or in a hollow space defined in a bent portion where the plurality of members intersect, and the reinforcing member is disposed in an outer corner part of the bent portion so as to define a space between the reinforcing member and the outer and inner members.

Preferably, the reinforcing member is formed precisely along the tubular hollow space defined between the outer and inner members.

Preferably, the outer member is made of a metallic material.

Preferably, ends of the reinforcing member are joined to metallic reinforcing members and the metallic reinforcing members are connected to each other through the reinforcing member.

Preferably, the reinforcing member is made of fiber reinforced plastic or carbon fiber reinforced plastic (hereinafter referred to as CFRP).

DESCRIPTION OF THE PREFERRED EMBODIMENTS

Figure 1:
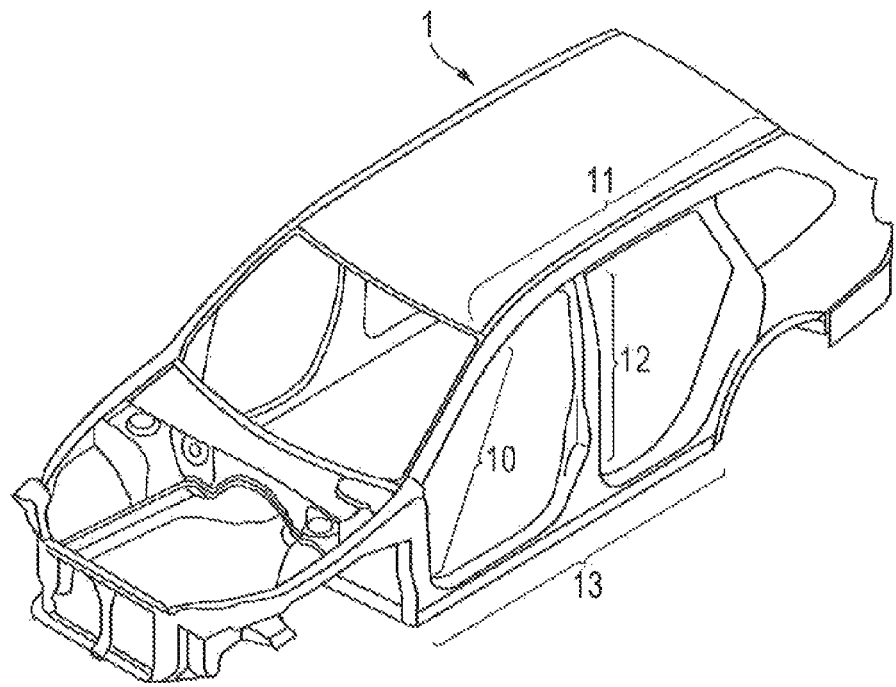
FIG. 1 is a perspective view of a frame of a vehicle according to a first aspect of the invention.

FIG. 1 illustrates a frame of a vehicle 1 according to a first aspect of the invention. A frame of a vehicle 1 of the invention will be described below with reference to FIG. 1.

FIG. 1 is a perspective view of the vehicle 1 according to the first aspect of the invention. A plurality of members constitutes a main frame of the vehicle 1. The main frame includes a front pillar 10, a roof pillar 11, a center pillar 12, a door sill 13, and the like.

The front pillar 10 constitutes a front section that defines a vehicle cabin space for the vehicle 1. The front pillar 10 is disposed in such a manner as to support a side of a front glass. The front pillar 10 extends from an upper section to a lower section of the vehicle 1 and is coupled to the roof pillar 11 and the door sill 13.

The roof pillar 11 extends longitudinally along an upper section that defines the vehicle cabin space for the vehicle 1 and constitutes a side portion of a roof of the vehicle 1.

The center pillar 12 is a post-like pillar located between a front door and a rear door of the vehicle 1 and is located so as to extend vertically on the side of the vehicle 1 between the side roof rail 11 and the door sill 13.

The door sill 13 is located so as to extend longitudinally on a lower section of the side of the vehicle 1.

The respective members further include a plurality of members such as a combination of an inner member and an outer member, and a combination of the inner and outer members and a reinforcement (a reinforcing member) interposed between the inner and outer members.

Figure 2:
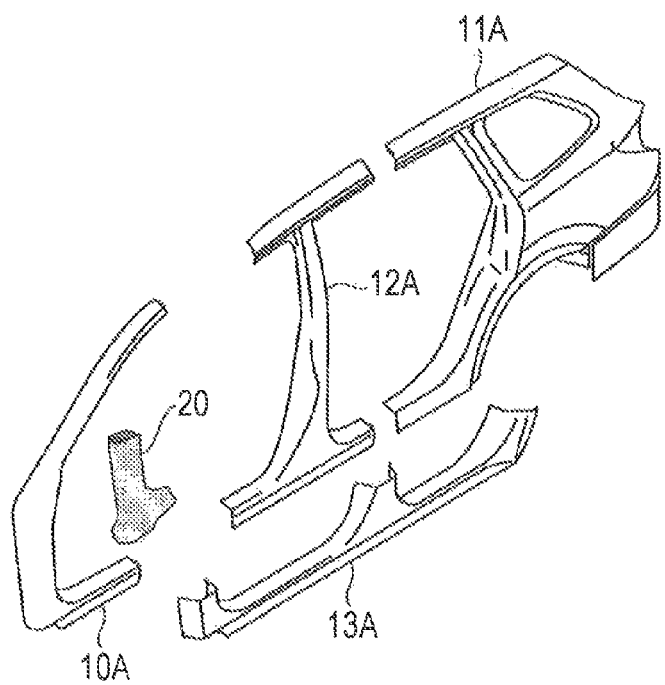
FIG. 2 is an enlarged and exploded perspective view of part of a vehicle according to first aspect of the invention.

FIG. 2 is an enlarged and exploded perspective view of part of a vehicle according to the first aspect of the invention. Part of the vehicle that has a monocoque structure includes a front pillar outer section 10A, a roof pillar outer section 11A, a center pillar outer section 12A, and a door sill outer section 13A. Cross sections of joined portions among the respective sections are substantially U-shaped or C-shaped.

The reinforcing member is provided on a portion in which two members out of the plurality of members intersect a point from two directions (hereinafter referred to "a two-member junction"), or on a bent portion of one of the plurality of members. In the first aspect, a reinforcing member 20 is provided in the bent portion of the front pillar outer section 10A. The reinforcing member 20 is made of CFRP.

Since part of the vehicle frame is constructed in the manner described above, the reinforcing member made of CFRP can preferably maintain strength against a collision. Also, the inherent stiffness of CFRP is sufficient for transmission of a load.

Furthermore, since the reinforcing member 20 has a three-directional structure filled with CFRP therein, the reinforcing member 20 can absorb noise caused by vibration or the like and can serve as a sound proofing material and a vibration proofing material.

Thus, by using the reinforcing member 20 in the vehicle frame, a balance between collision safety and driving stability can be achieved. Heretofore, a steel sheet, an iron sheet, an aluminum sheet, or the like has been used in order to reinforce vehicle frames. However, since CFRP which has a light weight is used in the vehicle frame in the first aspect, it is possible to reduce the total weight of the vehicle 1. In addition, since CFRP serves as a sound proofing material and a vibration proofing material, it is possible to introduce a sound proofing effect and a vibration proofing effect into a vehicle cabin space.

For example, in the case where an instantaneous force is applied to the front pillar 10 from a front direction of the vehicle, if the bent portion of the front pillar 10 does not have a balance between strength for supporting the bent portion and stiffness for transmitting the force to the bent portion, the force applied to the front pillar 10 is not transmitted to the other members effectively. The bent portion has insufficient strength. Consequently, there may be a case where the front pillar 10 is bent. However, according to the first aspect, by designing a reinforcing resin so as to achieve a balance between strength and stiffness, it is possible to effectively transmit the force applied to the front pillar 10 to the other members and to prevent the front pillar 10 from being bent.

Furthermore, a force from a front direction of the vehicle is transmitted to a bumper and a front side member disposed inside each of front side right and left wheels and is transmitted to a stiffener joined between the front pillar 10 and the front side member, so that the force is dispersed on the front pillar 10, the door sill 13, a center tunnel, and the like. Thus, the whole force from the front direction of the vehicle is not received on the front section of the vehicle and part of the force can be introduced to the rear section of the vehicle.

The invention can be applied to not only the junction that requires transmission of the external force mentioned above and strength against the external force, for example, not only the junction in the front pillar 10, the roof pillar 11, the center pillar 12, or the door sill 13, but also to a bent portion and a junction in a front side member, a stiffener or a center tunnel. Also, it is possible to apply the present invention to a combination of a side sill and a torque box, a combination of a door sill and an A pillar, a combination of a door sill and a B pillar, a combination of a side sill and a cross member, a combination of an A pillar and an upper frame, a combination of an A pillar (or a side panel) and a front roof rail (a laterally crossing member), a combination of a side panel and a roof center brace (a laterally crossing member), and a combination of a C pillar or a D pillar (or a side panel) and a rear roof rail (a laterally crossing member).

In the case where there is a clearance in the joined section at the junction, the reinforcing member made of CFRP is inserted into the clearance and the respective members are coupled through the reinforcing member to each other, thereby enabling the joined section to satisfy the requirements for strength and stiffness.

Although carbon fiber reinforced plastic (CFRP) is used in the first aspect of the invention, fiber reinforced plastic (FRP), carbon fiber reinforced thermoset (CFRTS), or carbon fiber reinforced thermoplastic (CFRTP) may be used in the first aspect. These materials can be used in accordance with the strength and stiffness characteristics or other properties required for the respective sections of the vehicle.

Although the reinforcing member 20 has the three-directional structure filled with CFRP therein in the first aspect of the invention, a material to be inserted into the reinforcing member 20 need not be CFRP but may be a foamed material. This will make it possible to adopt a foamed material that has a further sound proofing effect and a further vibration proofing effect.

Figure 3:
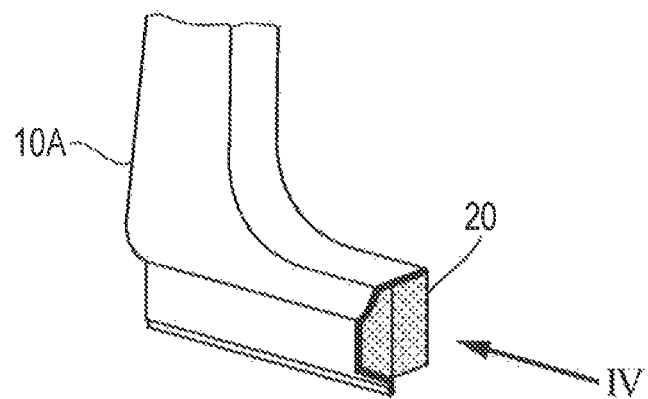
FIG. 3 is an enlarged perspective view of part of the vehicle frame according to a first embodiment of the invention, partially illustrating a cross section of the vehicle frame.

Next, specific embodiments of the invention will be described with reference to the drawings. FIG. 3 is an enlarged perspective view of part of the vehicle frame according to a first embodiment of the invention, partially illustrating a cross section of the vehicle frame.

The reinforcing member 20 is fitted in the bent portion of a front pillar outer section 10A that has a U shape in cross section. The reinforcing member 20 has a size suitable for engagement with the front pillar outer section 10A. The reinforcing member 20 is made of CFRP. It is not necessary to provide the reinforcing member 20 for the whole front pillar outer section 10A. The reinforcing member 20 is located on the bent portion of the front pillar outer section 10A so as to have a length that is determined in accordance with the required strength and stiffness.

First Embodiment

Figure 4:
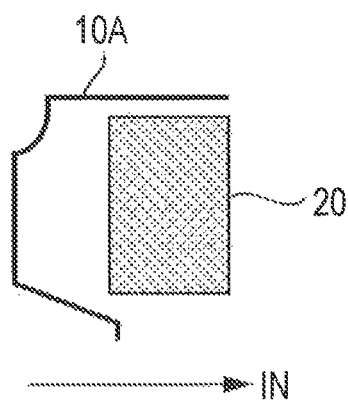
FIG. 4 is an enlarged sectional view of part of the vehicle frame according to the first embodiment of the invention, illustrating the schematic cross section taken in the direction indicted by an arrow IV in FIG. 3.

FIG. 4 is an enlarged sectional view of part of the vehicle frame according to the first embodiment of the invention, illustrating the cross section taken in the direction indicated by an arrow IV in FIG. 3. As illustrated in FIG. 4, the reinforcing member 20 made of CFRP is disposed on an inner wall of the front pillar outer section 10A so that part of the reinforcing member 20 nearly comes into contact with the inner wall and so that a space is defined between the reinforcing member 20 and an outward projection of the front pillar outer section 10A.

Second Embodiment

Figure 5A:
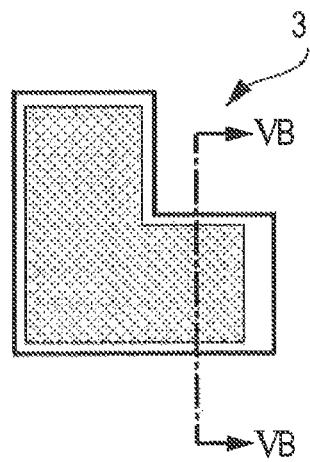
FIG. 5A is an enlarged schematic sectional view of part of the vehicle frame according to a second embodiment of the invention.
Figure 5B:
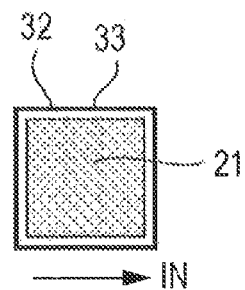
FIG. 5B is a schematic cross-sectional view of part of the vehicle frame taken along a two-dot chain line VB-VB in FIG. 5A.

FIG. 5A is an enlarged sectional view of part of the vehicle frame according to the second embodiment of the invention. FIG. 5B is a cross-sectional view of the part taken along a two-dot chain line VB-VB in FIG. 5A. FIG. 5A and FIG. 5B illustrate that an outer member 32 and an inner member 33 are engaged with each other so as to define the bent portion 31 of the vehicle frame and that a reinforced member 21 made of CFRP is disposed in a hollow space in the bent portion 31.

In such a layout, the reinforcing member 21 has a shape that nearly comes into contact with a hollow space in the bent portion 31 defined by the outer member 32 and the inner member 33, that is, nearly comes into contact with inner side walls of the outer member 32 and inner member 33. The reinforcing member 21 is disposed in a tubular hollow space defined between the outer member 32 and the inner member 33 so as to make a clearance in which the reinforcing member 21 nearly comes into contact with inner walls of the outer member 32 and the inner member 33. At this time, the reinforcing member 21 may be adhered to or may not be adhered to the outer member 32 or the inner member 33 by an adhesive or screws.

When an impact load is applied to the bent portion 31, the clearance between the reinforcing member 21 and the outer and inner members 32 and 33 is cleared and the impact force is directly transmitted to the bent portion 31.

Third Embodiment

Figure 6A:
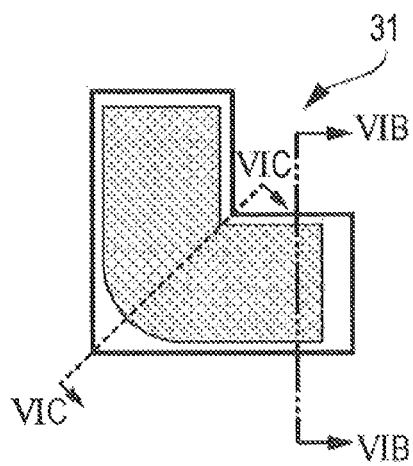
FIG. 6A is an enlarged schematic sectional view of part of the vehicle frame according to a third embodiment of the invention.
Figure 6B:
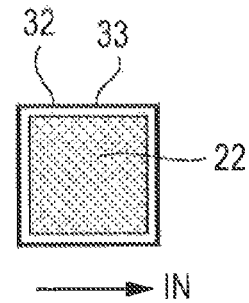
FIG. 6B is a schematic cross-sectional view of part of the vehicle frame taken along a two-dot chain line VIB-VIB in FIG. 6A.
Figure 6C:
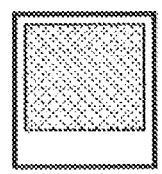
FIG. 6C is a schematic cross-sectional view of part of the vehicle frame taken along a dotted line VIC-VIC in FIG. 6A.

FIG. 6A is an enlarged schematic sectional view of part of the vehicle frame according to a third embodiment of the invention. FIG. 6B is a schematic cross-sectional view of part of the vehicle frame taken along a two-dot chain line VIB-VIB in FIG. 6A. FIG. 6C is a schematic cross-sectional view of part of the vehicle frame taken along a dotted line VIC-VIC in FIG. 6A. FIGS. 6A to 6C illustrate that the outer member 32 and the inner member 33 are engaged with each other at the bent portion 31 of the frame of the vehicle 1 and that a reinforcing member 22 made of CFRP is disposed in a tubular hollow space in the bent portion 31.

In such a layout, the reinforcing member 22 has a shape that nearly comes into contact with a tubular hollow space in the bent portion 31 defined by the outer member 32 and the inner member 33. However, as illustrated in FIG. 6A and FIG. 6C, there is a space between a left lower inner wall of the bent portion 31 and the reinforcing member 22. The reinforcing member 22 is disposed in the tubular hollow space defined in a bent portion of one of the plurality of members or in a hollow space defined in a bent portion where the plurality of members intersect, and the reinforcing member 22 is disposed in an outer corner part of the bent portion so as to define a space between the reinforcing member 22 and inner walls of the outer member 32 and the inner member 33. At this time, the reinforcing member 22 may be adhered to or may not be adhered to the outer member 32 or the inner member 33 by an adhesive or screws. A position of the reinforcing member 22 may be disposed in a bent portion of one of the plurality of members or a bent portion where the plurality of members intersects.

When an impact load is applied to the bent portion 31, the clearance between the reinforcing member 22 and the outer and inner members 32 and 33 of the bent portion 31 is cleared and the impact load is directly transmitted to the bent portion 31.

Fourth Embodiment

Figure 7:
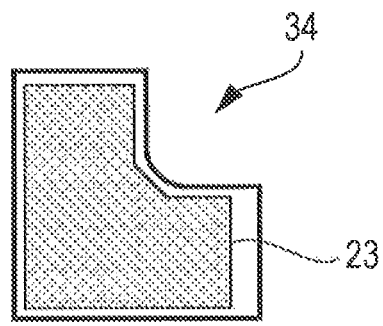
FIG. 7 is an enlarged sectional view of part of the vehicle frame according to a fourth embodiment of the invention.

FIG. 7 is an enlarged sectional view of part of the vehicle frame according to a fourth embodiment of the invention. FIG. 7 illustrates that the outer member and the inner member are engaged with each other at a bent portion 34 of the frame of the vehicle 1 and that a reinforcing member 23 made of CFRP is disposed in a hollow space in the bent portion 34.

In such a layout, the reinforcing member 23 has a shape that closely extends along a tubular hollow space defined by the outer and inner members and nearly comes into contact with the inner walls of the outer and inner members. At this time, the reinforcing member 23 may be adhered to or may not be adhered to the outer member or the inner member by an adhesive or screws.

When an impact load is applied to the bent portion 34, the clearance between the reinforcing member 23 and the outer and inner members is cleared and the impact load is directly transmitted to the bent portion 34.

Fifth Embodiment

Figure 8:
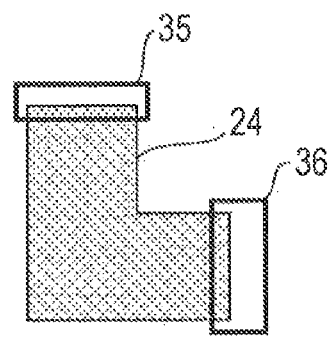
FIG. 8 is an enlarged sectional view of part of the vehicle frame according to a fifth embodiment of the invention.

FIG. 8 is an enlarged sectional view of part of the vehicle frame according to a fifth embodiment of the invention. FIG. 8 illustrates that a first member 35 and a second member 36 at a junction of two members of the frame of the vehicle 1 are connected with each other through a reinforcing member 24 made of CFRP.

The first member 35 and the second member 36 are coupled to the reinforcing member 24, respectively. In such a layout, strength and stiffness at the junction of the two members can be adjusted by the reinforcing member 24.

Sixth Embodiment

Figure 9:
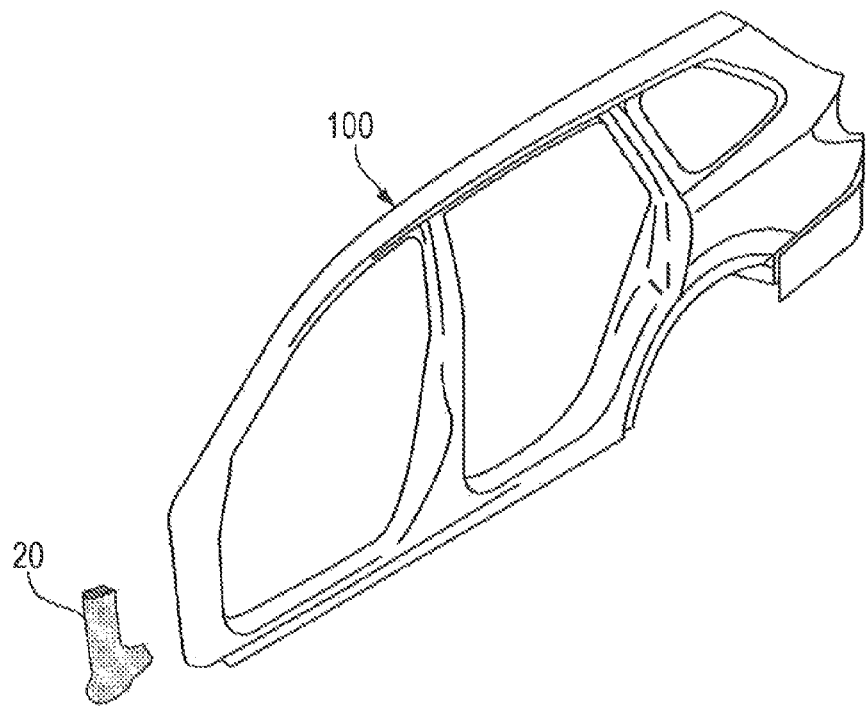
FIG. 9 is an enlarged and exploded perspective view of part of a vehicle according to a sixth embodiment of the invention.

FIG. 9 is an enlarged and exploded perspective view of part of a vehicle according to a sixth embodiment of the invention. A side structural body 100 is an outer panel that is constructed continuously. The side structural body 100 is constructed by continuously connecting, for example, a front pillar outer member, a roof pillar outer member, a center pillar outer member, and a door sill outer member with each other. The side structural body 100 is made of a metallic material. In the sixth embodiment, the reinforcing member 20 is disposed in a bent portion of the side structural body 100.

Since the reinforcing member 20 is disposed in the bent portion of the side structural body 100 made of a metallic material, a force applied to the bent portion, in which the reinforcing member 20 is disposed, is transmitted to the side structural body 100 made of the metallic material and formed continuously, thereby enabling the force to be dispersed further effectively. Also, since the side structural body 100 is constructed continuously, stiffness and strength can be enhanced.

Seventh Embodiment

Figure 10:
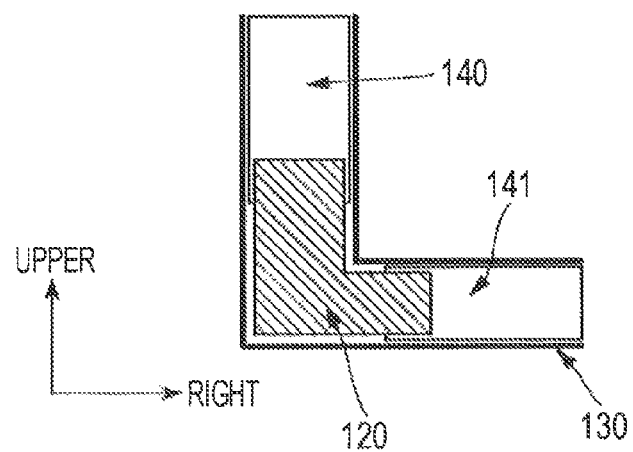
FIG. 10 is an enlarged sectional view of part of the vehicle frame according to a seventh embodiment of the invention.

FIG. 10 is an enlarged sectional view of part of a vehicle frame according to a seventh embodiment of the invention. FIG. 10 illustrates that a reinforcing member 120 made of CFRP is disposed in a bent portion 130 of a frame of the vehicle 1. The bent portion 130 defines a tubular hollow space and outer and inner members are engaged with each other in the tubular hollow space. An upper side metallic reinforcing member 140 made of a metallic material and a right side metallic reinforcing member 141 made of a metallic material are disposed in the tubular hollow space in a tubular member which has an upper side extending portion and a right side extending portion in FIG. 10. The upper and right side metallic reinforcing members 140 and 141 are connected to the reinforcing member 120. In the seventh embodiment, the bent portion 130 has a three-directional structure. The upper side metallic reinforcing member 140 made of a metallic plate is engaged with an upper outer periphery of the reinforcing member 120 filled with CFRP while the right side metallic reinforcing member 141 is engaged with a right outer periphery of the reinforcing member 120. The opposite ends of the reinforcing member 120 are connected to the metallic reinforcing members (the upper and right side metallic members 140 and 141) and the metallic members are coupled to each other through the reinforcing member 120.

Since the reinforcing member 120 made of CFRP is provided in the bent portion 130 of the vehicle frame 1 and the opposite ends of the bent portion 130 are constructed by the upper and right side metallic members 140 and 141, strength and stiffness of the bent portion 130 can be further enhanced.

Figure 11:
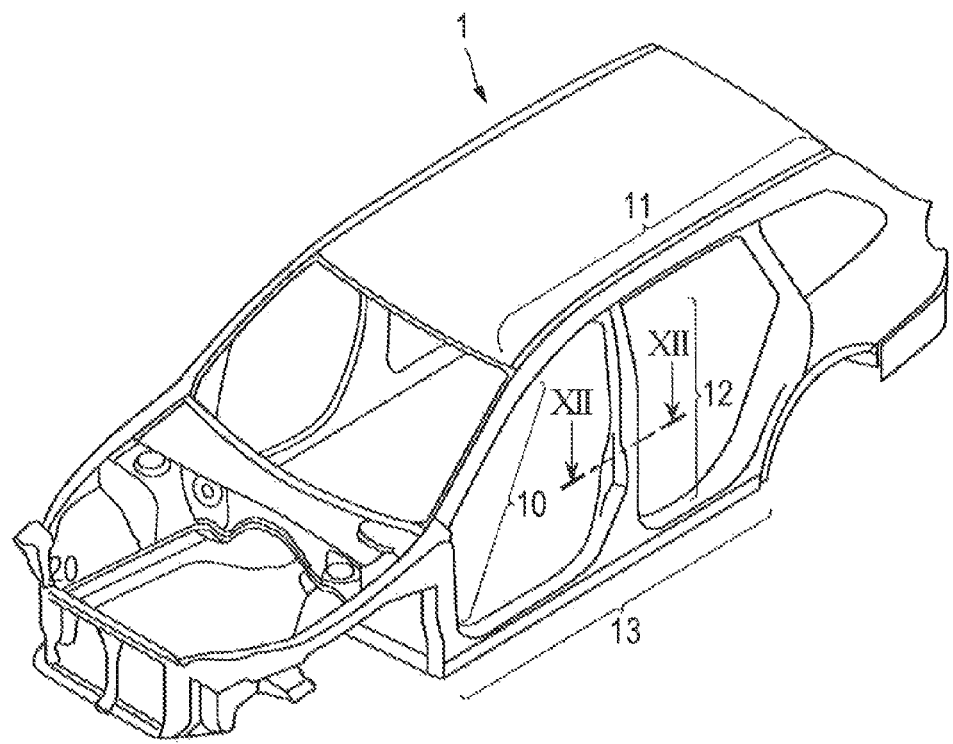
FIG. 11 is a perspective view of a frame of a vehicle according to a second aspect of the invention.
Figure 12:
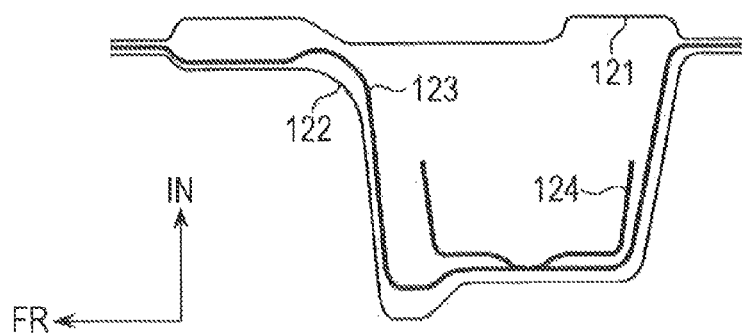
FIG. 12 is an enlarged schematic sectional view of part of the vehicle frame according to the second aspect of the invention, illustrating a cross section of the vehicle frame taken along a line XII-XII in FIG. 11.

Next, a second aspect of the reinforcing member according to the invention will be described below. FIG. 11 and FIG. 12 illustrate the frame of a vehicle 1 according to a second aspect of the invention. The second aspect of the invention will be described in accordance with FIG. 11 and FIG. 12. FIG. 11 illustrates a vehicle in the second aspect of the invention. The explanations concerning the same construction of the vehicle in FIG. 11 as that of the vehicle in FIG. 1 are omitted here by giving the same signs to the construction in FIG. 11, as appropriate.

The respective members includes a plurality of elements such as a combination of inner and outer members, a combination of inner and outer members and a reinforcement (a reinforcing member) interposed between the inner and outer members. In the second aspect, the reinforcement is made of the carbon fiber reinforced plastic (CFRP).

FIG. 12 is an enlarged schematic sectional view of part of the vehicle frame according to the second aspect of the invention, illustrating a cross section of the vehicle frame taken along a line XII-XII in FIG. 11. A pillar center inner 121 that serves as an inner member is coupled to a panel side outer 122 that serves as an outer member. Reinforcement pillar center outers 123 and 124 that serve as reinforcing members are disposed between the pillar center inner 121 and the panel side outer 122.

The reinforcement pillar center outers 123 and 124 are made of CFRP. The panel side outer 122 is made of a metallic material.

Ends of the pillar center inner 121 and the panel side outer 122 are coupled to each other by an adhesive, screws, rivets, or a resin.

According to the above layout, the reinforcement (reinforcing member) interposed between the inner and outer members made of CFRP can preferably maintain strength and stiffness against collision. Inherent stiffness exerted in CFRP can carry out transmission of the load preferably.

Thus, by using the reinforcing member made of CFRP, the vehicle frame can accomplish a balance between collision safety and driving stability. Since the conventional reinforcement using a steel sheet, an iron sheet, an aluminum sheet, or the like is altered by using CFRP having a light weight, it is possible to reduce a total weight of the vehicle 1.

For example, in the case where an instantaneous force is applied to the front pillar 10 from a front direction of the vehicle, if the bent portion of the front pillar 10 does not have a balance between strength for supporting the bent portion and stiffness for transmitting the force to the bent portion, the force applied to the front pillar 10 is not transmitted to the other members effectively. The bent portion becomes insufficient strength. Consequently, there may be a case where the front pillar 10 is bent. However, according to the second aspect, by designing a reinforced resin so as to satisfy a balance between strength and stiffness, it is possible to effectively transmit the force applied to the front pillar 10 to the other members and to prevent the front pillar 10 from being bent.

Furthermore, a force from a front direction of the vehicle is transmitted to a bumper and a front side member disposed inside each of front side right and left wheels and is transmitted to a stiffener joined between the front pillar 10 and the front side member, so that the force is dispersed on the front pillar 10, the door sill 13, a center tunnel, and the like. Thus, the whole force from the front direction of the vehicle is not received on the front section of the vehicle and part of the force can be introduced to the rear section of the vehicle.

The invention can be applied to not only the member that requires transmission of an external force and strength against the external force, for example, not only a member such as the front pillar 10, the roof pillar 11, the center pillar 12, or the door sill 13 that is described in connection with FIG. 1, but also a member such as a front side member, a stiffener or a center tunnel. Also, it is possible to apply the invention to a combination of a side sill and a torque box, a combination of a door sill and an A pillar, a combination of a door sill and a B pillar, a combination of a side sill and a cross member, a combination of an A pillar and an upper frame, a combination of an A pillar (or a side panel) and a front roof rail (a laterally crossing member), a combination of a side panel and a roof center brace (a laterally crossing member), and a combination of a C pillar or a D pillar (or a side panel) and a rear roof rail (a laterally crossing member).

In the case where there is a clearance in the joined section of these members, the reinforcing member made of CFRP is inserted into the clearance in order to reinforce the joined section and the respective members are coupled through the reinforcing member to each other, thereby enabling the joined section to satisfy the required strength and stiffness.

Usually, the vehicle frame is made of steel sheets that have different strength and stiffness. This can serve the need for a collision safety standard by using plural kinds of high tensile strength steel sheets or super high tensile strength steel sheets.

On the other hand, in the case where plural kinds of high tensile strength steel sheets or super high tensile strength steel sheets are not available on account of circumstances or environments in a manufacturing factory, it is possible to utilize the invention. That is, it is possible to design the respective sections of the vehicle frame that requires strength and stiffness by utilizing the reinforcement made of a few kinds of high tensile strength steel sheets or super high tensile strength steel sheets in the second aspect.

It is possible to adjust strength and stiffness by changing a thickness of the panel side outer 122 made of the metallic material in the second aspect, a thickness of the reinforcement made of CFRP, a direction of a fiber when producing and working a resin, or a synthetic material.

According to the invention, it is possible to obtain required strength and stiffness by utilizing CFRP, even if only a few kinds of steel sheets are available, that is, even if plural kinds of steel sheets that have required strength or the like are not available.

Although carbon fiber reinforced plastic (CFRP) are used in the second aspect of the invention, fiber reinforced plastic (FRP), carbon fiber reinforced thermoset (CFRTS), or carbon fiber reinforced thermoplastic (CFRTP) may be used in the first aspect. These materials can be used in accordance with characteristics or other properties required for the respective sections of the vehicle.

Next, specific embodiments, that is, an eighth embodiment through a seventeenth embodiment will be described below with reference to FIG. 13 through FIG. 22.

Eighth Embodiment

Figure 13:
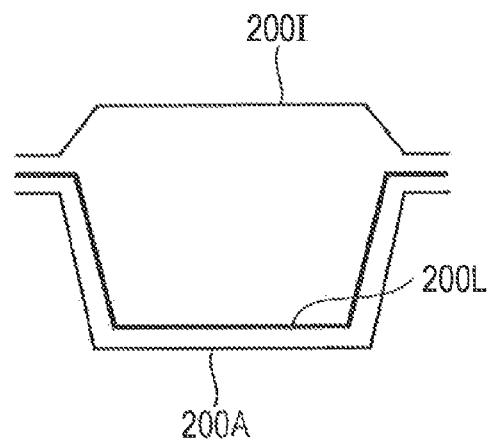
FIG. 13 is an enlarged schematic sectional view of part of the vehicle frame according to an eighth embodiment of the invention.

FIG. 13 is an enlarged schematic sectional view of part of a vehicle frame according to an eighth embodiment of the invention.

FIG. 13 is a cross sectional view of members of a vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, and a reinforcement 200L that is formed into a concave shape along the outer panel 200A and is made of CFRP.

The outer panel 200A, the inner panel 200I, and the reinforcement 200L are connected to each other by an adhesive, screws, rivets, or a resin.

According to the above construction, a force is linearly transmitted to the reinforcement 200L made of CFRP. This construction can obtain high strength and a light weight.

Ninth Embodiment

Figure 14:
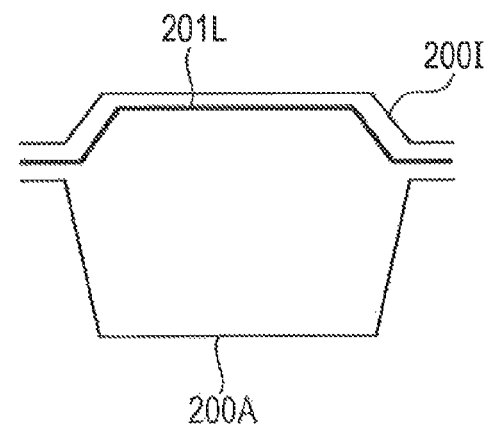
FIG. 14 is an enlarged schematic sectional view of part of the vehicle frame according to a ninth embodiment of the invention.

A ninth embodiment of the invention will be described below in accordance with FIG. 14. FIG. 14 is an enlarged schematic sectional view of part of a vehicle frame according to the ninth embodiment.

FIG. 14 is a cross sectional view of members of a vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, and a reinforcement 201L that is formed into a convex shape along the inner panel 200I and is made of CFRP.

The outer panel 200A, the inner panel 200I, and the reinforcement 201L are connected to each other by an adhesive, screws, rivets, or a resin.

According to the above construction, a force is linearly transmitted to the reinforcement 201L made of CFRP. This construction can obtain high strength and a light weight.

Tenth Embodiment

Figure 15:
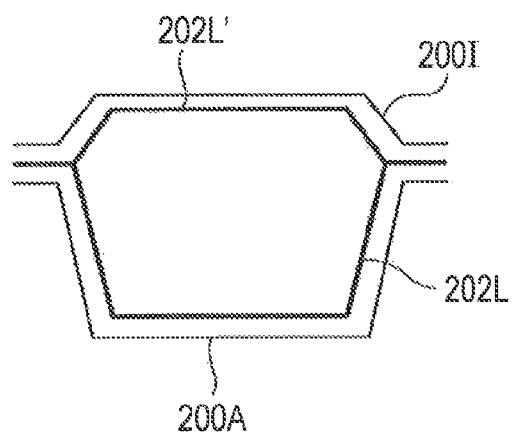
FIG. 15 is an enlarged schematic sectional view of part of the vehicle frame according to a tenth embodiment of the invention.

A tenth embodiment of the invention will be described below in accordance with FIG. 15. FIG. 15 is an enlarged schematic sectional view of part of a vehicle frame according to the tenth embodiment.

FIG. 15 is a cross sectional view of members of a vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, a reinforcement 202L that is formed into a concave shape along the outer panel 200A and is made of CFRP, and a reinforcement 202L' that is formed into a convex shape along the inner panel 200I and is made of CFRP.

The outer panel 200A, the inner panel 200I, and the reinforcements 202L and 202L' are connected to each other by an adhesive, screws, rivets, or a resin.

According to the above construction, a force is linearly transmitted to the reinforcements 202L and 202L' made of CFRP. This construction can obtain high strength and a light weight.

Eleventh Embodiment

Figure 16:
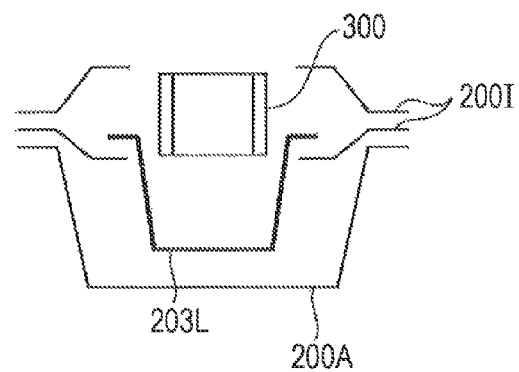
FIG. 16 is an enlarged schematic sectional view of part of the vehicle frame according to an eleventh embodiment of the invention.

An eleventh embodiment of the invention will be described below in accordance with FIG. 16. FIG. 16 is an enlarged schematic sectional view of part of a vehicle frame according to the eleventh embodiment.

FIG. 16 is a cross sectional view of members of the vehicle 1 such as the center pillar 12. The vehicle 1 includes an outer panel 200A that is formed into a concave shape and is made of a metallic material, an inner panel 201I that serves to hold a seat belt retractor 300, and a reinforcement 203L that is formed into a convex shape from inner ends of the inner panel 201I to the outer panel 200A and is made of CFRP.

Both of the outer panel 200A and the inner panel 201I, and both of the inner panel 201I and the reinforcement 203L are connected to each other by an adhesive, screws, rivets, or a resin.

According to the above construction, a force is linearly transmitted to the reinforcement 203L made of CFRP. This construction can obtain high strength and a light weight.

Twelfth Embodiment

Figure 17:
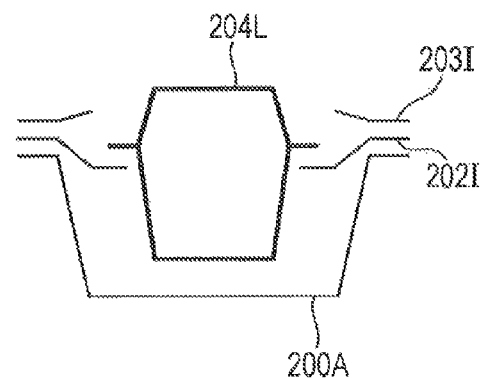
FIG. 17 is an enlarged schematic sectional view of part of the vehicle frame according to a twelfth embodiment of the invention.

A twelfth embodiment of the invention will be described below in accordance with FIG. 17. FIG. 17 is an enlarged schematic sectional view of part of a vehicle frame according to the twelfth embodiment.

FIG. 17 is a cross sectional view of members of the vehicle 1 such as the center pillar 12. The vehicle 1 includes an outer panel 200A that is formed into a concave shape and is made of a metallic material, inner panels 202I and 203I, and a reinforcement 204L that is formed into an O shape from inner ends of the inner panel 202I and is made of CFRP.

Both of the outer panel 200A and the inner panels 202I and 203I, and both of the inner panel 202I and the reinforcement 204L are connected to each other by an adhesive, screws, rivets, or a resin.

According to the above construction, a force is linearly transmitted to the reinforcement 204L made of CFRP. This construction can obtain high strength and a light weight.

Thirteenth Embodiment

Figure 18:
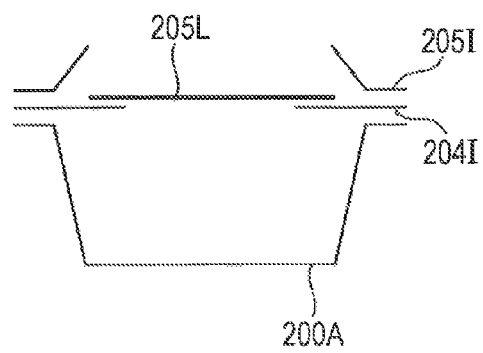
FIG. 18 is an enlarged schematic sectional view of part of the vehicle frame according to a thirteenth embodiment of the invention.

A thirteenth embodiment of the invention will be described below in accordance with FIG. 18. FIG. 18 is an enlarged schematic sectional view of part of a vehicle frame according to the thirteenth embodiment.

FIG. 18 is a cross sectional view of members of the vehicle 1 such as the center pillar 12. The vehicle 1 includes an outer panel 200A that is formed into a concave shape and is made of a metallic material, inner panels 204I and 205I and a reinforcement 205L that is formed into a plate-like shape connected inner ends of the inner panel 204I and is made of CFRP.

Both of the outer panel 200A and the inner panes 204I and 205I, and both of the inner panel 204I and the reinforcement 205L are connected to each other by an adhesive, screws, rivets, or a resin.

According to the above construction, a force is linearly transmitted to the reinforcement 205L made of CFRP. This construction can obtain high strength and a light weight.

Fourteenth Embodiment

Figure 19:
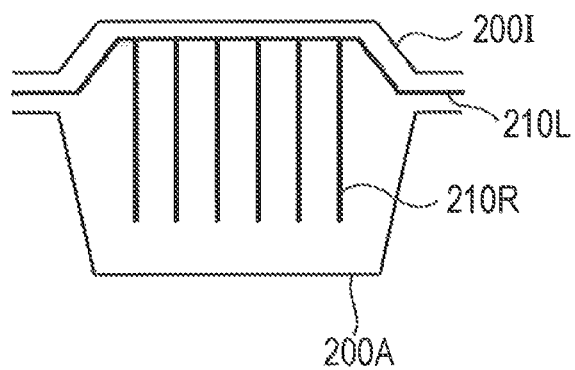
FIG. 19 is an enlarged schematic sectional view of part of the vehicle frame according to a fourteenth embodiment of the invention.

A fourteenth embodiment of the invention will be described below in accordance with FIG. 19. FIG. 19 is an enlarged schematic sectional view of part of a vehicle frame according to the fourteenth embodiment.

FIG. 19 is a cross sectional view of members of the vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, and a reinforcement 210L that is formed into a convex shape along the inner panel 200I and is provided with a plurality of plate-like ribs 210R that have the same thickness and length and extend from the inner panel side to the outer panel side. The reinforcement 210L and the ribs 210R are made of CFRP.

The outer panel 200A, the inner panel 200I, and the reinforcement 204L are connected to each other by an adhesive, screws, rivets, or a resin.

According to the above construction, a force is linearly transmitted to the reinforcement 210L made of CFRP. In addition, since the ribs 210R serve as impact absorption members, strength of the vehicle frame can be significantly enhanced.

The lengths of the respective plate-like ribs 210R may be set to be different and the thickness of the ribs 210R may be reduced from the inner panel side to the outer panel side. This can adjust impact strength of the ribs 210R against a force from free ends of the ribs 210R.

Fifteenth Embodiment

Figure 20:
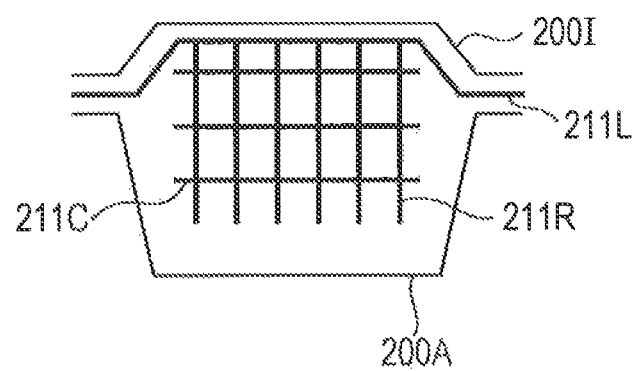
FIG. 20 is an enlarged schematic sectional view of part of the vehicle frame according to a fifteenth embodiment of the invention.

A fifteenth embodiment of the invention will be described below in accordance with FIG. 20. FIG. 20 is an enlarged schematic sectional view of part of a vehicle frame according to the fifteenth embodiment.

FIG. 20 is a cross sectional view of members of the vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, and a reinforcement 211L that is formed into a convex shape along the inner panel 200I and is provided with a plurality of vertical plate-like ribs 211R and horizontal plate-like ribs 211C. The ribs 211R and 211C are intersected with each other perpendicularly to form a grid-like shape. The ribs 211R have the same thickness and length and extend from the inner panel side to the outer panel side. The reinforcement 210L and the ribs 211R and 211C are made of CFRP.

The outer panel 200A, the inner panel 200I, and the reinforcement 211L are connected to each other by an adhesive, screws, rivets, or a resin.

According to the above construction, a force is linearly transmitted to the reinforcement 211L made of CFRP. In addition, since the ribs 211R and 211C serve as impact absorption members, strength of the vehicle frame can be significantly enhanced.

The lengths of the respective plate-like ribs 211R and 211C may be set to be different and the thickness of the ribs 211R may be reduced from the inner panel side to the outer panel side. This can adjust impact strength of the ribs 211R against a force from free ends of the ribs 211R.

Sixteenth Embodiment

Figure 21:
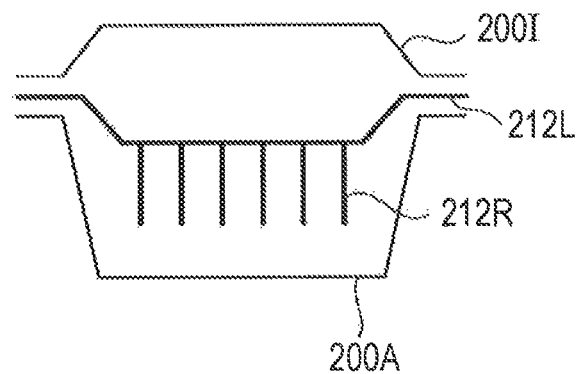
FIG. 21 is an enlarged schematic sectional view of part of the vehicle frame according to a sixteenth embodiment of the invention.

A sixteenth embodiment of the invention will be described below in accordance with FIG. 21. FIG. 21 is an enlarged schematic sectional view of part of a vehicle frame according to the sixteenth embodiment.

FIG. 21 is a cross sectional view of members of the vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, and a reinforcement 212L that is formed into a concave shape along the outer panel 200A and is provided with a plurality of plate-like ribs 212R that have the same thickness and length and extend from the inner panel side to the outer panel side. The reinforcement 212L and the ribs 212R are made of CFRP.

The outer panel 200A, the inner panel 200I, and the reinforcement 212L are connected to each other by an adhesive, screws, rivets, or a resin.

According to the above construction, a force is linearly transmitted to the reinforcement 212L made of CFRP. In addition, since the ribs 210R serve as impact absorption members, strength of the vehicle frame can be significantly enhanced.

The lengths of the respective plate-like ribs 212R may be set to be different and the thickness of the ribs 212R may be reduced from the inner panel side to the outer panel side. This can adjust impact strength of the ribs 212R against a force from free ends of the ribs 212R.

Seventeenth Embodiment

Figure 22:
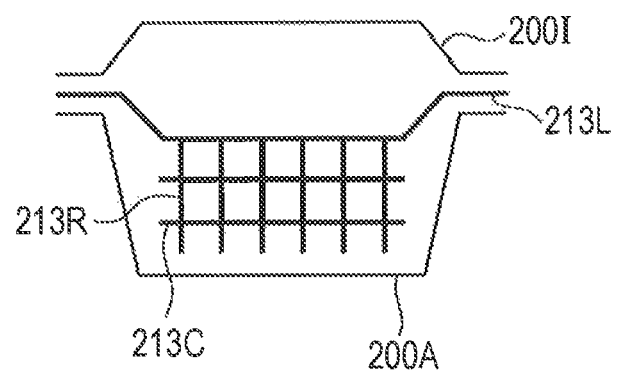
FIG. 22 is an enlarged schematic sectional view of part of the vehicle frame according to a seventeenth embodiment of the invention.

A seventeenth embodiment of the invention will be described below in accordance with FIG. 22. FIG. 22 is an enlarged schematic sectional view of part of a vehicle frame according to the seventeenth embodiment.

FIG. 22 is a cross sectional view of members of the vehicle 1 such as the front pillar 10, the roof pillar 11, the center pillar 12, and the door sill 13. The vehicle 1 includes an outer panel 200A that is formed into a concave shape and is made of a metallic material, an inner panel 200I that is formed into a convex shape and is made of a metallic material, and a reinforcement 213L that is formed into a concave shape along the outer panel 200A and is provided with a plurality of vertical plate-like ribs 213R and horizontal plate-like ribs 213C. The ribs 213R and 213C are intersected with each other perpendicularly to form a grid-like shape. The ribs 213R have the same thickness and length and extend from the inner panel side to the outer panel side. The reinforcement 213L and the ribs 213R and 213C are made of CFRP.

The outer panel 200A, the inner panel 200I, and the reinforcement 213L are connected to each other by an adhesive, screws, rivets, or a resin.

According to the above construction, a force is linearly transmitted to the reinforcement 213L made of CFRP. In addition, since the ribs 213R and 213C serve as impact absorption members, strength of the vehicle frame can be significantly enhanced.

The lengths of the respective plate-like ribs 213R and 213C may be set to be different and the thickness of the ribs 213R may be reduced from the inner panel side to the outer panel side. This can adjust impact strength of the ribs 213R against a force from free ends of the ribs 213R.

It should be noted that the invention is not limited to the above embodiments. The invention may include variously altered constructions and structures. For example, it is possible to utilize a reinforcement that does not have flange and is made of the carbon fiber reinforced plastic (CFRP). The invention can be applied to not only a vehicle but also a wing of an airplane and a ship.

Figure 23:
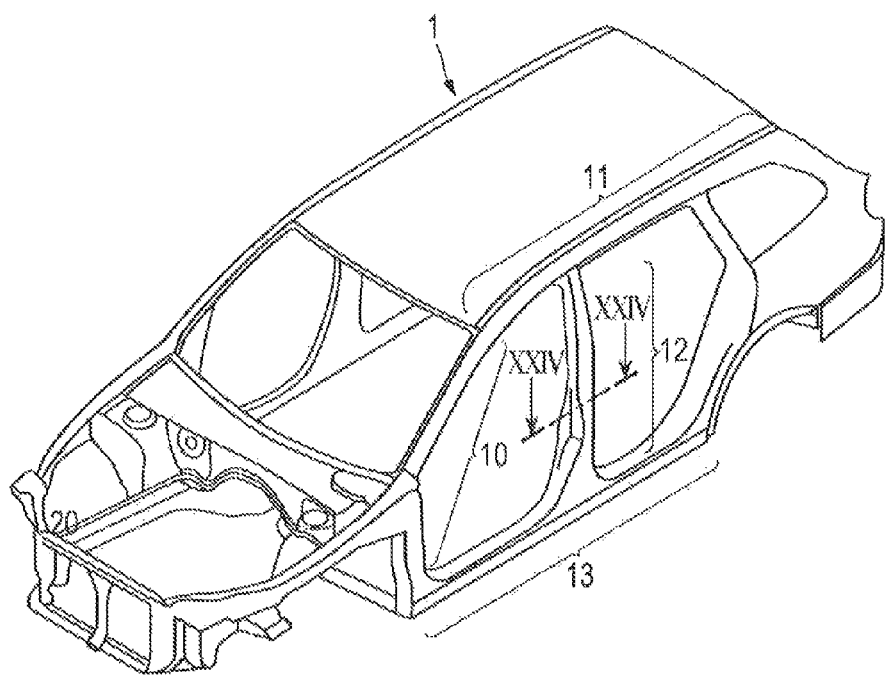
FIG. 23 is a perspective view of a frame of a vehicle according to a third aspect of the invention.
Figure 24:
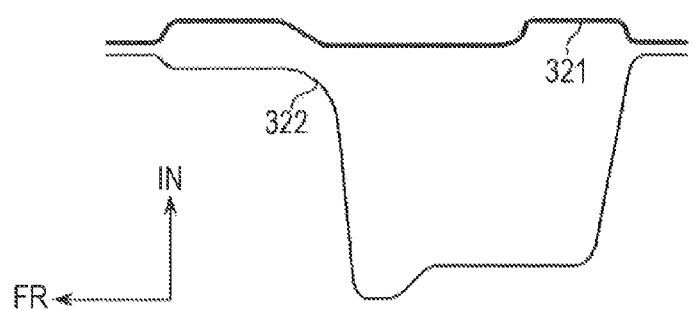
FIG. 24 is an enlarged schematic sectional view of part of the vehicle frame according to a third aspect of the invention, illustrating a cross section of the vehicle frame taken along a line XXIV-XXIV in FIG. 23.

Next, a third aspect of the reinforcing member according to the invention will be described below. FIG. 23 and FIG. 24 illustrate the frame of a vehicle according to a third aspect of the invention. The third aspect of the invention will be described in accordance with FIG. 23 and FIG. 24. FIG. 23 illustrates a vehicle in the third aspect of the invention. The explanations concerning the same construction of the vehicle in FIG. 23 as that of the vehicle in FIG. 1 are omitted here by giving the same signs to the construction in FIG. 23, as appropriate.

The respective members includes a plurality of members such as a combination of inner and outer members, a combination of inner and outer members and a reinforcement (a reinforcing member) interposed between the inner and outer members. In the third aspect, the reinforcement is made of the carbon fiber reinforced plastic (CFRP).

FIG. 24 is an enlarged schematic sectional view of part of the vehicle frame according to the third aspect of the invention, illustrating a cross section of the vehicle frame taken along a line XXIV-XXIV in FIG. 23. A pillar center inner 321 is coupled to a panel side outer 322. The pillar center inner 321 is made of CFRP. The panel side outer 322 is made of a metallic material.

Ends of the pillar center inner 321 and the panel side outer 322 are coupled to each other by an adhesive, screws, rivets, or a resin.

Figure 25:
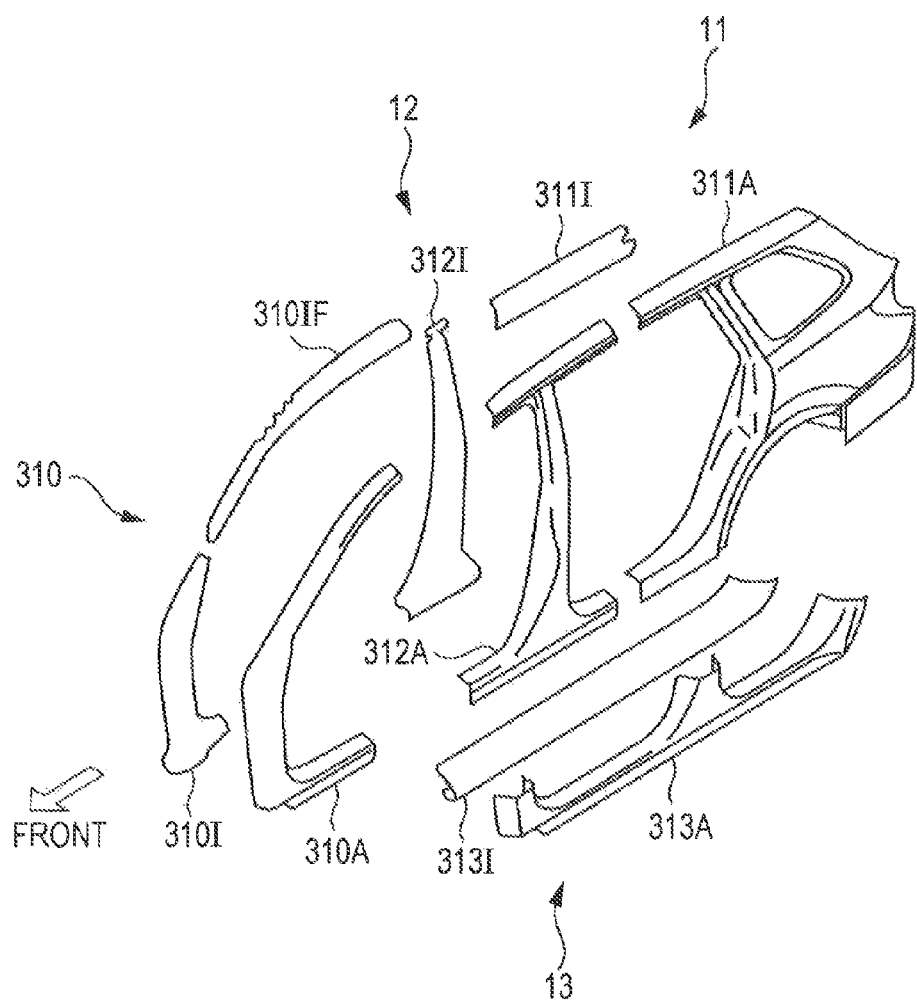
FIG. 25 is an enlarged and exploded perspective view of part of the vehicle frame according to the fourth aspect of the invention.

FIG. 25 is an enlarged and exploded perspective view of part of a vehicle frame according to the fourth aspect of the invention. A front pillar 310 includes a front pillar outer element 310A, a front pillar inner element 310I, and a front pillar inner front element 310IF. The front pillar inner element 310I and the front pillar inner front element 310F are made of the carbon fiber reinforced plastic (CFRP).

A roof pillar 11 includes part of a roof pillar outer element 311A, part of a center pillar outer element 312A, and a roof pillar inner element 311I. The roof pillar inner element 311I is made of CFRP.

A center pillar 12 includes a center pillar outer element 312A and a center pillar inner element 312I. The center pillar outer element 312A is made of a metallic material. The center pillar inner element 312I is made of CFRP.

A door sill 13 includes a door sill outer element 313A and a door sill inner element 313I. The door sill inner element 313I is made of CFRP.

According to the above layout, the inner elements of the respective members made of CFRP can preferably maintain strength against collision. Inherent stiffness exerted in CFRP can carry out transmission of the load preferably.

Thus, by using the reinforcing members, the vehicle frame can accomplish a balance between collision safety and driving stability. Since the conventional inner elements using a steel sheet, an iron sheet, an aluminum sheet, or the like is altered so as to be made of CFRP, it is possible to reduce a total weight of the vehicle 1.

For example, in the case where an instantaneous force is applied to the front pillar 10 from a front direction of the vehicle, if there is no a balance between strength against a bending action to the front pillar 10 and stiffness for transmission of a load to the bent portion of the front pillar 10, the force applied to the front pillar 10 is not transmitted to the other members effectively. The front pillar 10 becomes insufficient strength. Consequently, there may be a case where the front pillar 10 is bent. However, according to the fourth aspect, by designing a reinforced resin so as to satisfy a balance between strength and stiffness, it is possible to effectively transmit the force applied to the front pillar 10 to the other members and to prevent the front pillar 10 from being bent.

Furthermore, a force from a front direction of the vehicle is transmitted to a bumper and a front side member disposed inside each of front side right and left wheels and is transmitted to a stiffener joined between the front pillar 10 and the front side member, so that the force is dispersed on the front pillar 10, the door sill 13, a center tunnel, and the like. Thus, the whole force from the front direction of the vehicle is not received on the front section of the vehicle and part of the force can be introduced to the rear section of the vehicle.

The invention can be applied to not only the member that requires transmission of the external force and strength against the external force, for example, not only the member such as the front pillar 10, the roof pillar 11, the center pillar 12, or the door sill 13 that is described in connection with FIG. 1, but also a member such as a front side member, a stiffener or a center tunnel. Also, it is possible to apply the present invention to a combination of a side sill and a torque box, a combination of a door sill and an A pillar, a combination of a door sill and a B pillar, a combination of a side sill and a cross member, a combination of an A pillar and an upper frame, a combination of an A pillar (or a side panel) and a front roof rail (a laterally crossing member), a combination of a side panel and a roof center brace (a laterally crossing member), and a combination of a C pillar or a D pillar (or a side panel) and a rear roof rail (a laterally crossing member).

In the case where there is a clearance in the joined section of these members, the reinforcing member made of CFRP is inserted into the clearance and the respective members are coupled through the reinforcing member to each other, thereby enabling the joined section to satisfy the required strength and stiffness.

Usually, the vehicle frame is made of steel sheets that have a plurality of strength and stiffness. This can serve the need for a collision safety standard by using plural kinds of high tensile strength steel sheets or super high tensile strength steel sheets.

On the other hand, in the case where plural kinds of high tensile strength steel sheets or super high tensile strength steel sheets are not available on account of circumstances or environments in a manufacturing factory, it is possible to utilize the invention. That is, it is possible to design the respective sections of the vehicle frame that requires strength and stiffness by utilizing the reinforcement made of a few kinds of high tensile strength steel sheets or super high tensile strength steel sheets in the fourth aspect.

It is possible to adjust strength and stiffness by changing a thickness of the inner elements made of CFRP, a direction of a fiber when producing and working a resin, or a synthetic material.

According to the invention, it is possible to obtain required strength and stiffness by utilizing the inner elements made of CFRP, even if only a few kinds of steel sheets are available, that is, even if plural kinds of steel sheets that have required strength or the like are not available.

Although carbon fiber reinforced plastic (CFRP) are used in the fourth aspect of the invention, fiber reinforced plastic (FRP), carbon fiber reinforced thermoset (CFRTS), or carbon fiber reinforced thermoplastic (CFRTP) may be used in the first aspect. These materials can be used in accordance with characteristics or other properties required for the respective sections of the vehicle.

Next, specific embodiments, that is, an eighteenth embodiment through a twenty-fifth embodiment will be described below with reference to FIG. 26 through FIG. 33.

Eighteenth Embodiment

Figure 26:
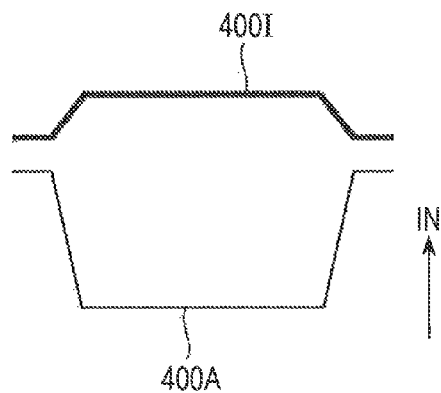
FIG. 26 is an enlarged schematic sectional view of part of the vehicle frame according to an eighteenth embodiment of the invention.

FIG. 26 is an enlarged schematic sectional view of part of a vehicle frame according to an eighteenth embodiment of the invention.

FIG. 26 is a cross sectional view of members of a vehicle 1 such as the front pillar 10, the roof pillar 11, the center pillar 12, and the door sill 13. The vehicle 1 includes an outer panel 400A that is formed into a concave shape and is made of a metallic material, and an inner panel 400I that is formed into a convex shape and is made of CFRP.

The outer panel 400A and the inner panel 400I are connected to each other by an adhesive, screws, rivets, or a resin.

According to the above construction, a force is linearly transmitted to the inner panel 400I made of CFRP. This construction can obtain high strength and a light weight.

Nineteenth Embodiment

Figure 27:
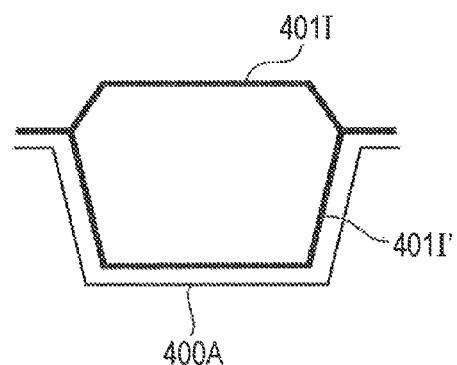
FIG. 27 is an enlarged schematic sectional view of part of the vehicle frame according to a nineteenth embodiment of the invention.

A nineteenth embodiment of the invention will be described below in accordance with FIG. 27. FIG. 27 is an enlarged schematic sectional view of part of a vehicle frame according to the nineteenth embodiment.

FIG. 27 is a cross sectional view of members of a vehicle 1 such as the front pillar 10, the roof pillar 11, the center pillar 12, and the door sill 13. The vehicle 1 includes an outer panel 400A that is formed into a concave shape and is made of a metallic material, an inner panel 401I that is formed into a convex shape and is made of CFRP, and an inner panel 401I' that is formed into a concave shape along the outer panel 400A and is made of CFRP.

The outer panel 400A and the inner panels 401I and 401I' are connected to each other by an adhesive, screws, rivets, or a resin.

According to the above construction, a force is linearly transmitted to the inner panels 401I and 401I' made of CFRP. This construction can obtain high strength and a light weight.

Twentieth Embodiment

Figure 28:
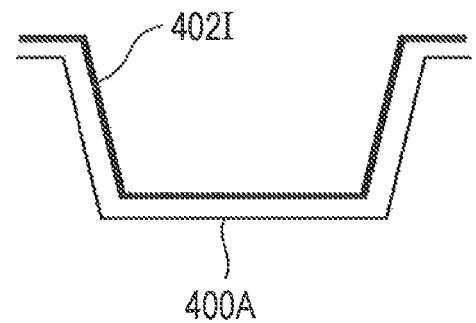
FIG. 28 is an enlarged schematic sectional view of part of the vehicle frame according to twentieth embodiment of the invention.

A twentieth embodiment of the invention will be described below in accordance with FIG. 28. FIG. 28 is an enlarged schematic sectional view of part of a vehicle frame according to the twentieth embodiment.

FIG. 28 is a cross sectional view of members of a vehicle 1 such as the front pillar 10, the roof pillar 11, the center pillar 12, and the door sill 13. The vehicle 1 includes an outer panel 400A that is formed into a concave shape and is made of a metallic material, and an inner panel 402I that is formed into a concave shape along the outer panel 400A and is made of CFRP.

The outer panel 200A and the inner panel 402I are connected to each other by an adhesive, screws, rivets, or a resin.

According to the above construction, a force is linearly transmitted to the inner panel 402I made of CFRP. This construction can obtain a light weight, since the reinforcement is not required.

Twenty-First Embodiment

Figure 29:
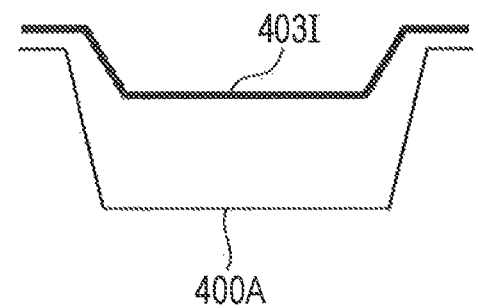
FIG. 29 is an enlarged schematic sectional view of part of the vehicle frame according to a twenty-first embodiment of the invention.

A twenty-first embodiment of the invention will be described below in accordance with FIG. 29. FIG. 29 is an enlarged schematic sectional view of part of a vehicle frame according to the twenty-first embodiment.

FIG. 29 is a cross sectional view of members of the vehicle 1 such as the front pillar 10, the roof pillar 11, the center pillar 12, and the door sill 13. The vehicle 1 includes an outer panel 400A that is formed into a concave shape and is made of a metallic material, an inner panel 403I that is formed into a concave shape toward the outer panel 400A and is made of CFRP.

The outer panel 400A and the inner panel 403I are connected to each other by an adhesive, screws, rivets, or a resin.

According to the above construction, a force is linearly transmitted to the inner panel 403I made of CFRP. This construction can obtain high strength and a light weight.

Twenty-Second Embodiment

Figure 30:
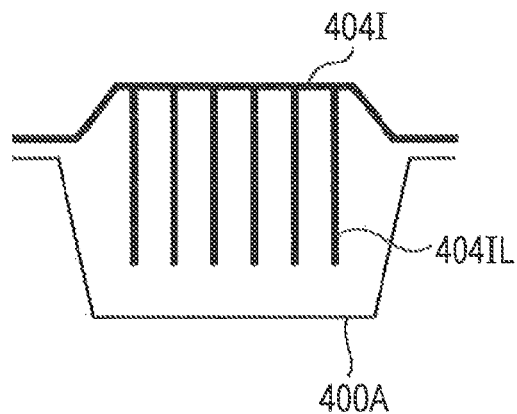
FIG. 30 is an enlarged schematic sectional view of part of the vehicle frame according to a twenty-second embodiment of the invention.

A twenty-second embodiment of the invention will be described below in accordance with FIG. 30. FIG. 30 is an enlarged schematic sectional view of part of a vehicle frame according to the twenty-second embodiment.

FIG. 30 is a cross sectional view of members of the vehicle 1 such as the front pillar 10, the roof pillar 11, the center pillar 12, and the door sill 13. The vehicle 1 includes an outer panel 400A that is formed into a concave shape and is made of a metallic material, an inner panel 200I that is formed into a convex shape and is made of a metallic material, and an inner panel 404I that is formed into a convex shape and is provided with a plurality of plate-like ribs 404IL that have the same thickness and length and extend from the inner panel side to the outer panel side. The inner panel 404I and ribs 404IL are made of CFRP.

The outer panel 400A and the inner panel 404I are connected to each other by an adhesive, screws, rivets, or a resin.

According to the above construction, a force is linearly transmitted to the inner panel 404I made of CFRP. In addition, since the ribs 404IL serve as impact absorption members, strength of the vehicle frame can be significantly enhanced.

The lengths of the respective plate-like ribs 404IL may be set to be different and the thickness of the ribs 404IL may be reduced from the inner panel side to the outer panel side. This can adjust impact strength of the ribs 404IL against a force from free ends of the ribs 404IL.

Twenty-Third Embodiment

Figure 31:
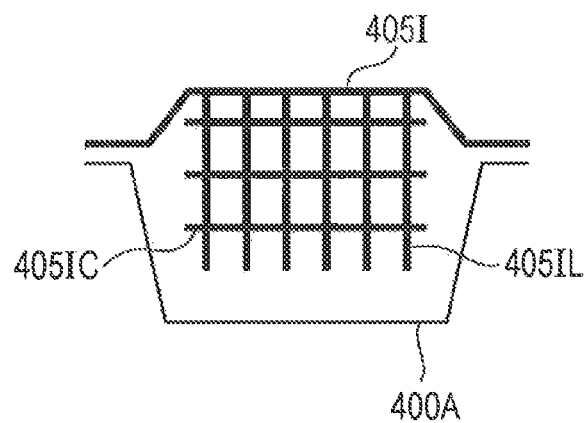
FIG. 31 is an enlarged schematic sectional view of part of the vehicle frame according to a twenty-third embodiment of the invention.

A twenty-third embodiment of the invention will be described below in accordance with FIG. 31. FIG. 31 is an enlarged schematic sectional view of part of a vehicle frame according to the twenty-third embodiment.

FIG. 31 is a cross sectional view of members of the vehicle 1 such as the front pillar 10, the roof pillar 11, the center pillar 12, and the door sill 13. The vehicle 1 includes an outer panel 400A that is formed into a concave shape and is made of a metallic material, and an inner panel 405I that is formed into a convex shape, is made of CFRP, and is provided with a plurality of vertical plate-like ribs 405IL and horizontal plate-like ribs 405IC that are made of CFRP. The ribs 405IL and 405IC are intersected with each other perpendicularly to form a grid-like shape. The ribs 405IL have the same thickness and length and extend from the inner panel side to the outer panel side.

The outer panel 400A and the inner panel 405I are connected to each other by an adhesive, screws, rivets, or a resin.

According to the above construction, a force is linearly transmitted to the inner panel 405I made of CFRP. In addition, since the ribs 405IL and 405IC serve as impact absorption members, strength of the vehicle frame can be significantly enhanced.

The lengths of the respective plate-like ribs 405IL and 405IC may be set to be different and the thickness of the ribs 405IL may be reduced from the inner panel side to the outer panel side. This can adjust impact strength of the ribs 405IL against a force from free ends of the ribs 405IL.

Twenty-Fourth Embodiment

Figure 32:
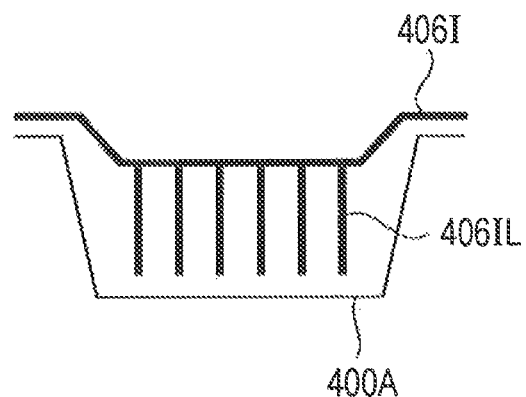
FIG. 32 is an enlarged schematic sectional view of part of the vehicle frame according to a twenty-fourth embodiment of the invention.

A twenty-fourth embodiment of the invention will be described below in accordance with FIG. 32. FIG. 32 is an enlarged schematic sectional view of part of a vehicle frame according to the twenty-fourth embodiment.

FIG. 32 is a cross sectional view of members of the vehicle 1 such as the front pillar 10, the roof pillar 11, the center pillar 12, and the door sill 13. The vehicle 1 includes an outer panel 400A that is formed into a concave shape and is made of a metallic material, and an inner panel 406I that is formed into a concave shape toward the outer panel 400A, is made of CFRP, and is provided with a plurality of plate-like ribs 406IL that have the same thickness and length and extend from the inner panel side to the outer panel side. The ribs 406IL are made of CFRP.

The outer panel 400A and the inner panel 406I are connected to each other by an adhesive, screws, rivets, or a resin.

According to the above construction, a force is linearly transmitted to the inner panel 406I made of CFRP. In addition, since the ribs 406IL serve as impact absorption members, strength of the vehicle frame can be significantly enhanced.

The lengths of the respective plate-like ribs 406IL may be set to be different and the thickness of the ribs 406IL may be reduced from the inner panel side to the outer panel side. This can adjust impact strength of the ribs 406IL against a force from free ends of the ribs 406IL. This can adjust impact strength of the ribs 406IL against a force from free ends of the ribs 406IL.

Twenty-Fifth Embodiment

Figure 33:
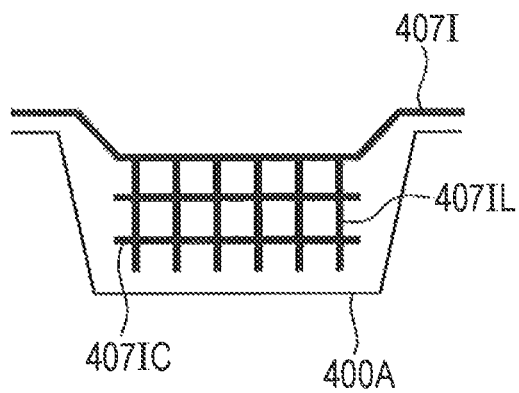
FIG. 33 is an enlarged schematic sectional view of part of the vehicle frame according to a twenty-fifth embodiment of the invention.

A twenty-fifth embodiment of the invention will be described below in accordance with FIG. 33. FIG. 33 is an enlarged schematic sectional view of part of a vehicle frame according to the twenty-fifth embodiment.

FIG. 33 is a cross sectional view of members of the vehicle 1 such as the front pillar 10, the roof pillar 11, the center pillar 12, and the door sill 13. The vehicle 1 includes an outer panel 400A that is formed into a concave shape and is made of a metallic material, and an inner panel 407I that is formed into a concave shape toward the outer panel 400A, is made of CFRP, and is provided with a plurality of vertical plate-like ribs 407IL and horizontal plate-like ribs 407IC. The ribs 407IL and 407IC are intersected with each other perpendicularly to form a grid-like shape. The ribs 407IL have the same thickness and length and extend from the inner panel side to the outer panel side. The reinforcement 407IL and 407IC are made of CFRP.

The outer panel 400A and the inner panel 407I are connected to each other by an adhesive, screws, rivets, or a resin.

According to the above construction, a force is linearly transmitted to the inner panel 407I made of CFRP. In addition, since the ribs 407IL and 407IC serve as impact absorption members, strength of the vehicle frame can be significantly enhanced.

The lengths of the respective plate-like ribs 407IL and 407IC may be set to be different and the thickness of the ribs 407IL may be reduced from the inner panel side to the outer panel side. This can adjust impact strength of the ribs 407IL against a force from free ends of the ribs 407IL.

It should be noted that the invention is not limited to the above embodiments. The invention may include variously altered constructions and structures. The invention can be applied to not only a vehicle but also a wing of an airplane and a ship.

Structures and Effects of the Embodiments

The vehicle according to the above embodiments has a monocoque structure that includes a plurality of members. The reinforcing member made of the reinforced resin is disposed in the junction of two members out of the plurality of members, or the bent portion of one member.

In the structure described above, the strength and stiffness of the junction of two members or the bent portion of one member are suitably set. This can realize a balance between collision safety and driving stability and further increased strength.

In the vehicle according to the above embodiments, the two members at a junction are joined through the reinforcing member.

In the structure described above, the strength and stiffness of the junction of two members can be enhanced.

The reinforcing member of the vehicle in the above embodiments has a three-directional structure.

By adopting the structure described above, it is possible to suitably set strength and stiffness and to further obtain a sound-proofing effect that can prevent noise caused by vibration and a vibration proofing effect.

In the vehicle according to the above embodiments, the reinforcing member is disposed in a hollow space in a bent portion defined by a single member or defined by intersecting the plurality of members and a space is defined between the reinforcing member and an outer corner of the bent portion.

According to the above construction, there is no clearance between the reinforcing member and the outer and inner members, thereby transmitting an impact force smoothly and controlling transmission of the impact force by means of the hollow space.

In the vehicle according to the above embodiments, the reinforcing member is formed precisely along the tubular hollow space defined between the outer and inner members.

According to the above construction, there is no clearance between the reinforcing member and the outer and inner members, thereby transmitting an impact force smoothly.

In the vehicle according to the above embodiments, the outer member is made of the metallic material.

According to the above construction, strength of the vehicle can be enhanced.

In the vehicle according to the above embodiments, the ends of the reinforcing member are joined to the metallic reinforcing members and the metallic reinforcing members are connected to each other through the reinforcing member.

According to the above construction, a balance between strength and stiffness can be obtained.

In addition, in the vehicle according to the above embodiments, the reinforced resin of the reinforcing member is fiber reinforced plastic or CFRP.

By adopting the structure described above, strength and stiffness can be suitably set. Therefore, a balance between collision safety and driving stability can be achieved.

DEFINITION

Reinforced plastic in the invention refer to fiber reinforced plastic (FRP), carbon fiber reinforced plastic (CFRP), carbon fiber reinforced thermoset (CFRTS), carbon fiber reinforced thermoplastic (CFRTP), and the like.

What is claimed is:
1. A vehicle frame structure comprising:
a main frame having a plurality of members; and
a reinforcing member made of a reinforced resin and disposed at a junction where two members of the plurality of members intersect while extending in two directions, or at a bent portion of one member of the plurality of members, wherein
the reinforcing member made of reinforced resin is filled with reinforced plastic or foamed material, and
a first metallic reinforcing member is engaged with a first end of the reinforcing member made of reinforced resin, and a second metallic reinforcing member is engaged with a second end of the reinforcing member made of reinforced resin, such that the first and second metallic reinforcing members are connected to one another by the reinforcing member made of reinforced resin.

2. The vehicle frame structure according to claim 1, wherein the reinforcing member made of reinforced resin is disposed at a junction where two members of the plurality of members intersect while extending in two directions, and the two members are joined through the reinforcing member made of reinforced resin.

3. The vehicle frame structure according to claim 1, wherein the reinforcing member made of reinforced resin is made of fiber reinforced plastic or carbon fiber reinforced plastic.

4. The vehicle frame structure according to claim 2, wherein the reinforcing member made of reinforced resin is made of fiber reinforced plastic or carbon fiber reinforced plastic.

5. The vehicle frame structure according to claim 1, wherein the reinforcing member made of reinforced resin is filled with foamed material.

6. The vehicle frame structure according to claim 2, wherein the reinforcing member made of reinforced resin is filled with foamed material.

7. The vehicle frame structure according to claim 1, wherein the reinforcing member made of reinforced resin is filled with fiber reinforced plastic.

8. The vehicle frame structure according to claim 2, wherein the reinforcing member made of reinforced resin is filled with fiber reinforced plastic.

9. The vehicle frame structure according to claim 1, wherein the reinforcing member made of reinforced resin is filled with carbon fiber reinforced plastic.

10. The vehicle frame structure according to claim 2, wherein the reinforcing member made of reinforced resin is filled with carbon fiber reinforced plastic.

11. The vehicle frame structure according to claim 1, wherein the reinforcing member made of reinforced resin is filled with carbon fiber reinforced thermoset.

12. The vehicle frame structure according to claim 2, wherein the reinforcing member made of reinforced resin is filled with carbon fiber reinforced thermoset.

13. The vehicle frame structure according to claim 1, wherein the reinforcing member made of reinforced resin is filled with carbon fiber reinforced thermoplastic.

14. The vehicle frame structure according to claim 2, wherein the reinforcing member made of reinforced resin is filled with carbon fiber reinforced thermoplastic.

15. The vehicle frame structure according to claim 1, wherein the first and second metallic reinforcing members are made of metallic plate.

16. A vehicle frame structure comprising:
a main frame having a plurality of members; and
a reinforcing member made of a reinforced resin and disposed at a junction where two members out of the plurality of members intersect a point from two directions, or at a bent portion of one member of the plurality of members, wherein
the reinforcing member made of reinforced resin is filled with carbon fiber reinforced plastic, and
a first metallic reinforcing member is engaged with an outer periphery of a first end of the reinforcing member made of reinforced resin, and a second metallic reinforcing member is engaged with an outer periphery of a second end of the reinforcing member made of reinforced resin, wherein both ends of the reinforcing member made of reinforced resin are joined to the metallic reinforcing members, and the metallic reinforcing members are connected to each other through the reinforcing member made of reinforced resin.

17. The vehicle frame structure according to claim 16, wherein the reinforcing member made of reinforced resin is disposed at a junction where two members of the plurality of members intersect while extending in two directions, and the two members are joined through the reinforcing member reinforcing member made of reinforced resin.

18. The vehicle frame structure according to claim 16, wherein the first and second metallic reinforcing members are metallic plate reinforcing members, and the metallic plate reinforcing members each have an interior surface that is engaged with the respective outer peripheries of the first and second ends of the reinforcing member made of reinforced resin.

19. The vehicle frame structure according to claim 17, wherein the first and second metallic reinforcing members are metallic plate reinforcing members, and the metallic plate reinforcing members each have an interior surface that is engaged with the respective outer peripheries of the first and second ends of the reinforcing member made of reinforced resin.

20. The vehicle frame structure according to claim 18, wherein the first end of the reinforcing member made of reinforcing resin is an upper end, and the first metallic plate reinforcing member has a lower end engaged with the upper end of the reinforcing member made of reinforcing resin.

* * * * *